United States Patent [19]
Suzuki

[11] Patent Number: 5,903,595
[45] Date of Patent: May 11, 1999

[54] DIGITAL MATCHED FILTER

[75] Inventor: Kuniyuki Suzuki, Tokyo, Japan

[73] Assignee: Mitsubishi Denki Kabushiki Kaisha, Tokyo, Japan

[21] Appl. No.: 08/804,978

[22] Filed: Feb. 27, 1997

[30] Foreign Application Priority Data

Dec. 10, 1996 [JP] Japan ................................. 8-329561

[51] Int. Cl.⁶ ............................................... H04K 1/10
[52] U.S. Cl. ........................................ 375/207; 375/343
[58] Field of Search .................................. 375/207, 208, 375/343; 364/724.11

[56] References Cited

U.S. PATENT DOCUMENTS

| | | | |
|---|---|---|---|
| 4,630,283 | 12/1986 | Schiff | 375/207 |
| 4,930,139 | 5/1990 | Chandler et al. | 375/207 |
| 5,144,640 | 9/1992 | Yamamoto | 375/208 |
| 5,583,884 | 12/1996 | Maruyama et al. | 375/207 |

FOREIGN PATENT DOCUMENTS 3-226135 10/1991 Japan .
7-58669 3/1995 Japan .

*Primary Examiner*—Stephen Chin
*Assistant Examiner*—Michael W. Maddox
*Attorney, Agent, or Firm*—Rothwell, Figg, Ernst & Kurz

[57] ABSTRACT

The digital matched filter according to the present invention comprises a storage circuit for accumulating received signals by an A/D converter without shifting the signals, an address signal generating circuit for controlling an address for accumulating output from the A/D converter there, a reference data generating circuit for generating spread code for receiving, a ring-formed shift register for shifting output from the reference data generating circuit, a multiplying circuit for multiplying output from the storage circuit not executing shifting by output from the shift register, an adding circuit for adding output from the multiplying circuit, and a timing signal generating circuit for controlling timing for the operations described above.

14 Claims, 12 Drawing Sheets

DIGITAL MATCHED FILTER

FIELD OF THE INVENTION

The present invention relates to a digital matched filter used in a receiver or the like in a spread spectrum-direct communication system.

BACKGROUND OF THE INVENTION

In a so-called direct sequence spread spectrum communication system wherein a signal obtained by multiplying an information signal by a broadband spread code is transmitted and a received signal is returned to a narrow-band signal by reversely spreading the received signal, an information signal can be detected even under a bad C/N (carrier to noise) ratio condition of a received electric wave, so that the spread spectrum-direct communication system is promising for a code division multiple access (CDMA) which is one of multiple access methods for a mobile communications system, and for this reason, less power consumption for the device is desired.

It is known that the digital matched filter can be used for high-speed synchronized capture and synchronized tracking for extracting synchronous timing as well as for data demodulation using the extracted synchronous timing by using the output of a spread code circuit (chip: each spread code circuit constituting a spread code array is described as a "chip"), in which the advantage of the digital matched filter as a passive correlator is made use of, each time a received signal is outputted. It is also known that, even in a case where receiver timing is displaced by a period of time shorter than one spread code time, sampling by an analog/digital converter (described as "A/D converter" hereinafter) is executed at a timing of ½, ¼, ⅛, 1/16 or the like of one spread code time and the digital matched filter can be used for synchronized capture, synchronized tracking, and data demodulation each with high precision by obtaining correlation output for each ½, ¼, ⅛, 1/16 or the like of one spread code time.

As an example of a configuration of the passive correlator, description is made herein of a BPSK (Binary Phase Shift Keying)-accommodating matched filter, which is the most simple configuration, with reference to FIG. 10. In a receiver for spread spectrum signals, a frequency of a received signal is converted and is lowered to a frequency of a baseband signal. This signal is held as a sample and is inputted to the matched filter as an input signal. The input signal is serially inputted to a delay line 1, then signals for each delay time are outputted in parallel. This parallel output is weighted according to an output for each delay time in each tap 2. All of the weighted parallel outputs are summed in the adding circuit 3 and outputted as correlation output (correlation value).

Next description is made for operations of a digital matched filter as one of examples in which the matched filter is digitally realized with reference to FIG. 11. Block configuration similar to that in FIG. 11 is disclosed, for instance, in Japanese Patent Laid-Open Publication No. HEI 7-58669. A received spread spectrum signal generated by the receiver, which is a received baseband signal, is sampled according to timing provided from a timing signal generating circuit 5 and is converted to a digital signal by an A/D converter 4. This digital signal is successively inputted to a shift register 31. On the other hand, a spread code as reference data is generated in a spread code generating circuit 7 and is inputted once in a load-queue buffer 8 and then inputted into a buffer 30 for multiplication. Herein the load-queue buffer 8 is applied to the spread spectrum system for subjecting the digital signal to spreading by using "long spread code" having a length sufficiently longer than that of one symbol for data in addition to "short spread code" having substantially the same length as that of one symbol for information used in a normal way of spreading, and is used for temporarily accumulating therein the spread code array outputted from the spread code generating circuit 7. Accordingly, the load-queue buffer 8 is not particularly needed in a system not using the "long spread code" therefor. Data for parallel output from the shift register 31 is multiplied by data for parallel output from the buffer 30 in the multiplying circuit 12. Each result of the multiplication is summed in the adding circuit 10, and the summed data is outputted as correlation output and used for synchronized capture, synchronzed tracking, and data demodulation. In the description above, specific comment was not made for the number of bits for the A/D converter 4, but an A/D converter with a plurality of bits is generally employed for reducing quantization errors as well as for enhancing performance thereof (processing for determination using a plurality of bits is generally called soft decision processing, and processing for determination using one bit is called hard decision processing). For this reason, the shift register 31 is also required to have such configuration that the plurality of bits can be accumulated therein.

FIG. 12 is an explanatory view for explanation of a relation between an information signal and a spread code. An information signal comprises a plurality of information bits each of which is a basic unit thereof. In an example 1 of spread code, one information bit length is spread by five spread code bits of 00110. The spread code length in this case is expressed as follows: Spread code length=5. On the other hand, in an example 2 of spread codes, a two-information bit is spread by 10 spread code bits of 0011010011. The spread code length in this case is expressed as follows: Spread code length=10. However, it is found that one information bit in the above case is also spread by five spread code bits. Also a period of time required for multiplying an information signal by one spread code is expressed as one spread code time. The examples 1, 2 of spread codes show examples each indicating one spread code time identical to each other respectively.

A digital matched filter based on the conventional technology has the configuration in which a received signal obtained by sampling is accumulated in a shift register and the received signal is shifted each time sampling. Especially, in a case where the A/D converter with a plurality of bits is used for enhancing the capability, the shift register is also required to accumulate therein and further shift the plurality of bits. In a digital circuit, a potential in the circuit generally fluctuates when a signal is changed, and power is consumed (it is known to require power consumption when binary numerals 0, 1 of an output signal are changed especially for a device such as a CMOS using process). Accordingly, power consumption is largely required also for a plurality of bits-accommodating shift register when data is shifted.

SUMMARY OF THE INVENTION

It is an object of the present invention to provide a digital matched filter with low-power consumption obtained by reducing power consumption in each digital circuit block constituting the digital matched filter.

A digital matched filter according to the present invention comprises, for executing correlation processing, an input signal generating means for successively sampling, quantizing according to a prespecified timing received spread spectrum signals subjected to spectrum spreading by applying a spread code array with a specified spread code length to an information signal consisting of information bits, storing therein the generated input data, and also outputting an input data array which is a plurality of stored input data described above, a reference signal generating means for outputting a reference data array generated from the same spread code array as that applied to the received spread spectrum signal in correlation to the input data array, a multiplying circuit for multiplying data in the input data array by corresponding data in the reference data array and outputting a plurality of multiplied data generated as described above, and an adding circuit for summing the plurality of multiplied data and outputting a generated correlation value wherein the input signal generating means comprises a storage circuit having a plurality of storage sites each capable of discretely storing therein at least the input data generated during a period corresponding to the spread code length according to an address signal specifying a discrete storage site corresponding to the input data and outputting the input data array according to the timing, and the reference signal generating means comprises a shift register for shifting and outputting the reference data array according to the timing.

As for multiplied data in a portion exceeding one information bit length which is an object for correlation processing, preset null data indicating no-input state is inputted in place of the multiplied data in the adding circuit.

As for input data in a portion exceeding one information bit length which is an object for correlation processing, preset null data indicating no-input state is inputted in place of the input data in the multiplying circuit.

The reference signal generating means generates and outputs a reference data array for reference data in a portion exceeding one information bit length which is an object for correlation processing by using the preset null data indicating no-input state in place of the spread code.

The reference signal generating means generates and outputs a reference data array from a reference code array consisting of spread code repeated by sampling times within one spread code length.

A digital matched filter according to another feature of the present invention comprises with an output from a shift register as a second reference data array, a latch circuit for storing the second reference data array and outputting the second reference data array as a new reference data array, a second multiplying circuit for multiplying data in an input data array by corresponding data in the second reference data array and outputting a plurality of generated second multiplied data, a second adding circuit for summing the plurality of second multiplied data and outputting a second correlation value generated as described above, and a determining means for comparing the second correlation value to a present reference correlation value and outputting a result of determination, and the digital matched filter selects either the multiplied data outputted from the multiplying circuit or preset null data indicating no-input state according to a result of determination and inputs the selected data in the adding circuit.

A digital matched filter according to still another feature of the present invention comprises with an output from a shift register as the second reference data array, a latch circuit for storing a second reference data array and outputting the second reference data array as a new reference data array, a second multiplying circuit for multiplying data in an input data array by corresponding data in the second reference data array and outputting a plurality of generated second multiplied data, a second adding circuit for summing the plurality of second multiplied data and outputting a second correlation value generated as described above, and a determining means for comparing the second correlation value to a present reference correlation value and outputting a result of determination, and the digital matched filter selects either input data outputted from a storage circuit or preset null data indicating no-input state according to the result of determination and inputs the selected data in the multiplying circuit.

The second multiplying circuit executes multiplication of only a portion of input data in an input data array outputted from a storage circuit by corresponding second reference data and outputs second multiplied data.

Also the second multiplying circuit executes multiplication of only a portion of quantized bits among a plurality of quantized bits in input data outputted from a storage circuit by corresponding second reference data and outputs second multiplied data.

Other objects and features of this invention will become understood from the following description with reference to the accompanying drawings.

DESCRIPTION OF THE PREFERRED EMBODIMENTS

Figure 1:
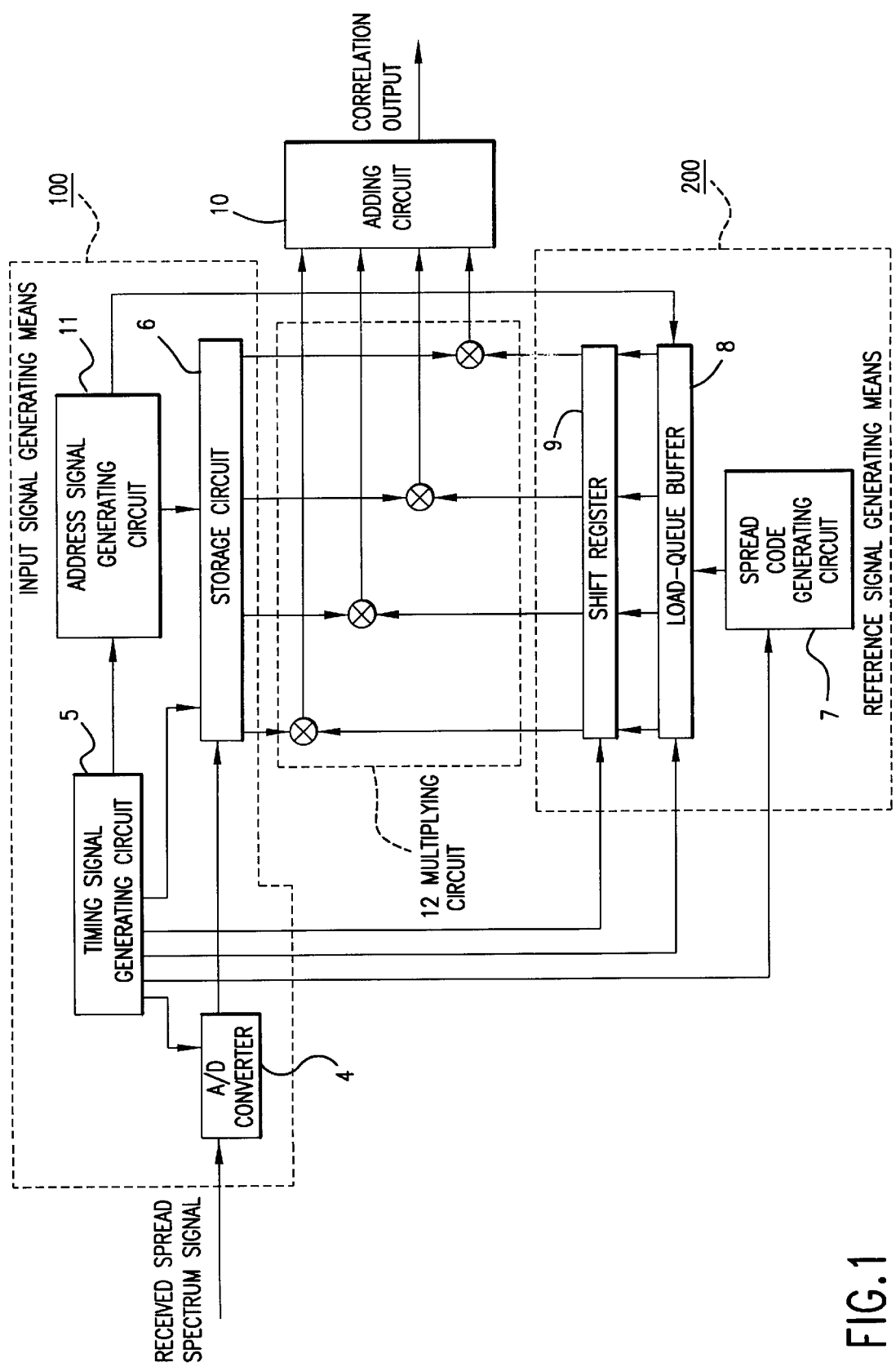
FIG. 1 is a block diagram showing a digital matched filter according to Embodiment 1 of the present invention.

Description is made hereinafter for Embodiment 1 of the present invention. FIG. 1 is a block diagram showing a digital matched filter according to Embodiment 1 of the present invention. Herein the digital matched filter is a BPSK-accommodating digital matched filter which has the most simple configuration for making the description easier to understand.

At first description is made for the configuration. In the figure, designated at the reference numeral 4 is an A/D converter for sampling a received spread spectrum signal which is a received baseband signal generated by a receiver, at a prespecified sampling timing outputted from a timing generating circuit 5 (described later). The sampled signal is converted to input data which is a digital signal consisting of a specified number of quantized bits. A timing signal generating circuit 5 generates various types of timing signals, including the sampling timing applied to the A/D converter 4, required for operations in each block described later; an address signal generating circuit 11 generates an address signal for storing input data outputted from the A/D converter 4 in a storage location in a storage circuit 6 (described later) according to an order of sampling; and at 6 a storage circuit for storing the input data in a storage location specified by the address signal and also outputting the input data stored in each storage location as an input data array consisting of a plurality of input data, at a specified timing from the timing generating circuit 5. An input signal generating means 100 comprises the component-blocks indicated by the reference numerals 4, 5, 6, and 11 respectively.

Reference numeral 7 is a spread code generating circuit for generating the same spread code array as that applied to the received spread spectrum signal; 8 is a load-queue buffer for temporarily accumulating a spread code array from the spread code generating circuit 7 in a case where "long spread code" is used and outputting the spread code array as a new spread code array, and 9 is a shift register for receiving a spread code array from the load-queue buffer 8, shifting the spread code array at a timing from the timing signal generating circuit 5 in synchronism with an interval of sampling in the A/D converter 4, and also outputting the shifted spread code array as a reference data array. Reference signal generating means 200 comprises the component-blocks indicated by the reference numerals 7, 8, and 9, respectively.

Reference numeral 12 is a multiplying circuit for multiplying data in the input data array from the storage circuit 6 by corresponding data in the reference data array from the shift register 9 and outputting a plurality of multiplied data generated as described above, and 10 is an adding circuit for summing the plurality of multiplied data and outputting a generated correlation value.

Figure 2:
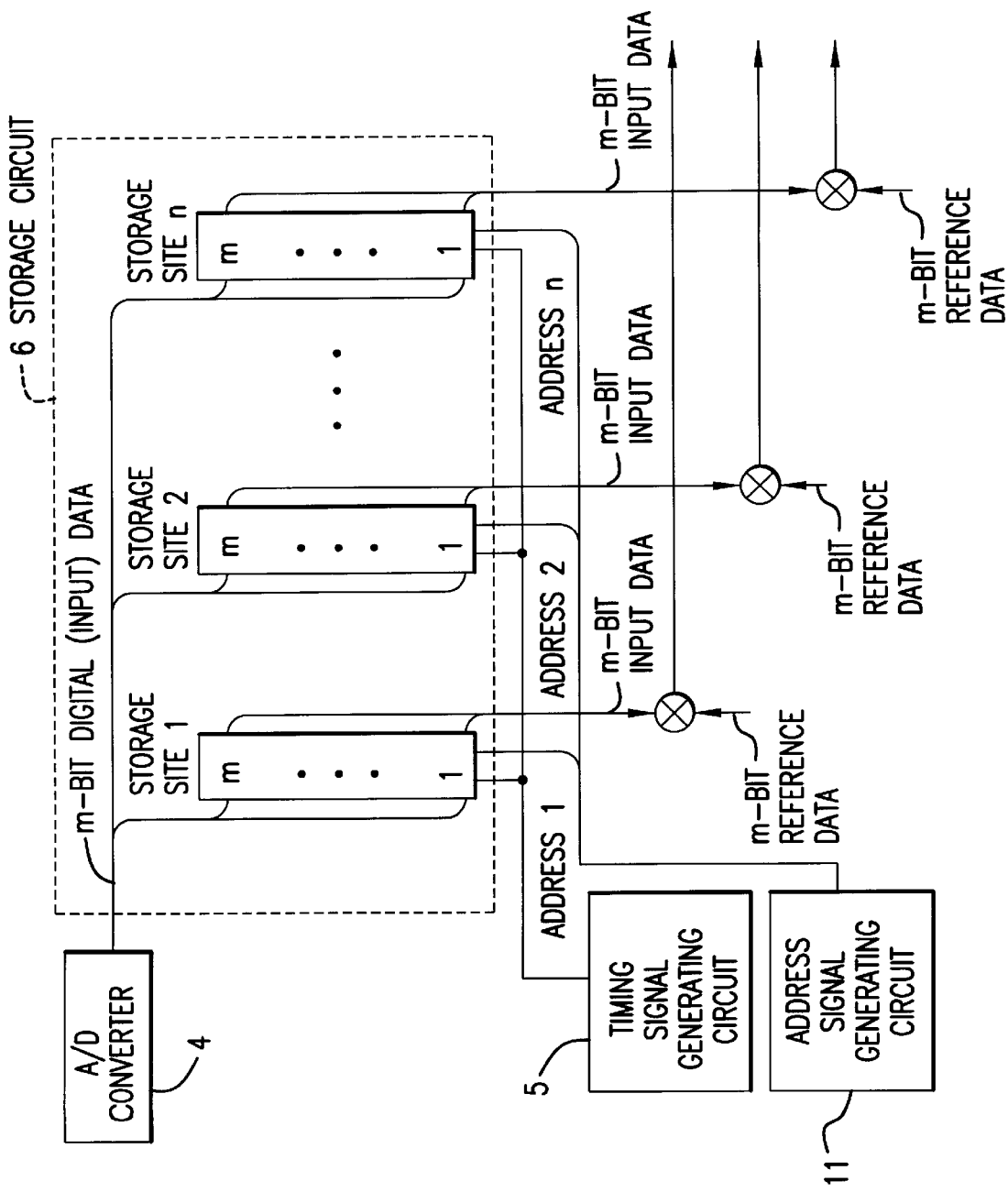
FIG. 2 is a block diagram showing inside of a storage circuit in the digital matched filter according to Embodiment 1 of the present invention.

Next description is made of the operation. Herein, it is assumed that sampling in the A/D converter 4 is executed for each one spread code time (which indicates a period of time equivalent to one spread code length). The timing signal generating circuit 5 holds received spread spectrum signals, for sampling for one spread code time, each generated by the receiver, and generates a sample timing signal so that the spread spectrum signal can be A/D-converted. The A/D converter 4 outputs input data as a digital signal according to the sample timing signal. As for the number of quantized bits for A/D conversion herein, a plurality of bits are desirable from a view point of reducing a quantization error. The address signal generating circuit 11 generates an address of a storage location in the storage circuit 6 for storing therein the input data. As for an address outputted for making configuration of the storage circuit simpler, for instance, values each cyclically displacing from each other one by one according to an order of sampling the received spread spectrum signals are desirable. The storage circuit 6 requires a memory space accommodating at least the processing executed when one information bit is spread by n-pieces of spread code (spread code length is n). Namely, assuming that the number of quantized bits for the A/D conversion is m-bits, a memory space of at least (m×n) bits is required. Timing for writing therein input data which is output from the A/D converter 4 is controlled so that the timing is not synchronized to timing for outputting an input data array to the multiplying circuit. FIG. 2 is a block diagram showing detailed configuration of the storage circuit 6. Addresses 1 to n are successively instructed for each sampling, and each sampling data is stored discretely in each of n-pieces of storage site 1 to n. Each storage site can store therein quantized data consisting of m-bits. Also the sampling data stored in each of the sites is programmed and outputted at the same time from all the n-pieces of storage site.

On the other hand, each spread code constituting a spread code array generated by the spread code generating circuit 7 is serially outputted to the load-queue buffer 8. Load of the spread code array from the load-queue buffer 8 to the shift register 9 is generally executed in parallel at each timing corresponding to one information bit. This shift register 9 has a ring-shaped configuration in which a spread code array is shifted once for each one spread code time and any overflowing spread code at the end of the array is inputted at the beginning of the shift register.

The multiplying circuit 12 multiplies data in the input data array of the storage circuit 6 by data in the reference data array of the shift register 9 and a result of the multiplication is inputted to the adding circuit 10. Correlation output for each spread code time can be obtained according to a result of the adding operation.

As described above, in Embodiment 1, the digital matched filter has such configuration that input data consisting of a plurality of quantized bits which have been sampled is accumulated at a prespecified storage site according to sampling so that the data is not shifted but a spread code array consisting of one bit which is a reference data array is shifted, and for this reason there are less number of circuit elements for shifting data for each sampling in the circuit block, and it is possible to reduce a change rate of potentials for 0 and 1 in the circuit, which makes it possible to reduce power consumption in the digital matched filter.

Figure 3:
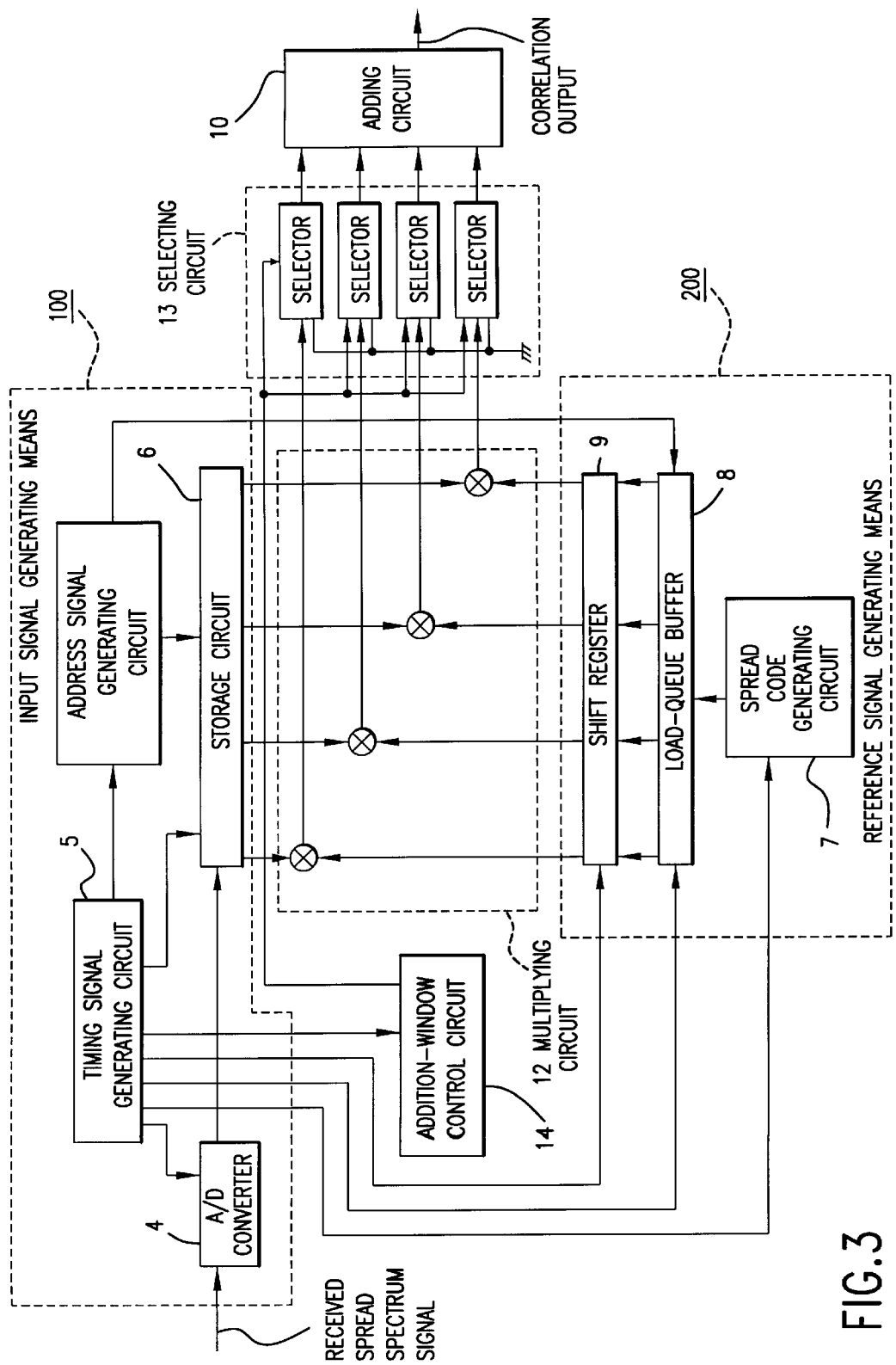
FIG. 3 is a block diagram showing a digital matched filter according to Embodiment 2 of the present invention.

Next description is made for Embodiment 2 of the present invention. In Embodiment 2, description is made for a case where one information bit length is different from spread code length (generally, spread code length>one information bit length). FIG. 3 is a block diagram showing a digital matched filter according to Embodiment 2.

In the figure, the reference numerals 4 to 12 indicate the same configuration as that in Embodiment 1 shown in FIG. 1, so that description thereof is omitted herein. The reference numeral 13 indicates a selecting circuit for selecting either one of multiplied data outputted from the multiplying circuit and null data indicating no-input state, and each selector is provided therein for each output of multiplied data. Herein, an example of selecting a GND level as null data is shown. The reference numeral 14 indicates an addition-window control circuit for controlling the selecting circuit 13, and, as for multiplied data in a portion exceeding one information bit length which is an object for correlation processing, the addition-window control circuit selects data so that multiplied data is generated by using the null data.

Next description is made for main points of operations. In Embodiment 2, it is assumed that sampling in the A/D converter 4 is executed once for each one spread code time. In a case where spread code length is longer than one information bit length like in a case of Embodiment 2, a memory space in the storage circuit 6 is required to be made larger than that for one information bit. Namely, assuming that the number of quantized bits for the A/D conversion is m bits, spread code length is (n+α) bits (wherein, n indicates one information bit length obtained by normalizing one spread code length as one bit (namely, the number of sampling times per one information bit), and α indicates a length of spread code length in a portion exceeding one information bit length (namely, the number of sampling times for a portion exceeding one information bit)), at least {m×(n+α)} bits are required for the memory capacity.

An input data array as an output from the storage circuit 6 is multiplied by a reference data array as an output from the shift register 9, so that a result of multiplication of α-piece values becomes data over one information bit length, which makes computing precision in summing up each value worse. For this reason, the addition-window control circuit 14 selects the code 0 for a portion exceeding one information bit length as an object to be computed by controlling each selector in the selecting circuit 13. With this selection, an adding operation becomes possible in the adding circuit 10 without any effect by the result of multiplication of α-piece values, and correlation output for each spread code time can be obtained.

As described above, in Embodiment 2, as for multiplied data in a portion exceeding one information bit length as an object for correlation processing, multiplied data is generated by using the preset null data indicating no-input state and is inputted to the adding circuit, so that there is no effect of the portion exceeding one information bit length over correlation output, which insures such effects that correlation processing with higher precision can be executed.

Figure 4:
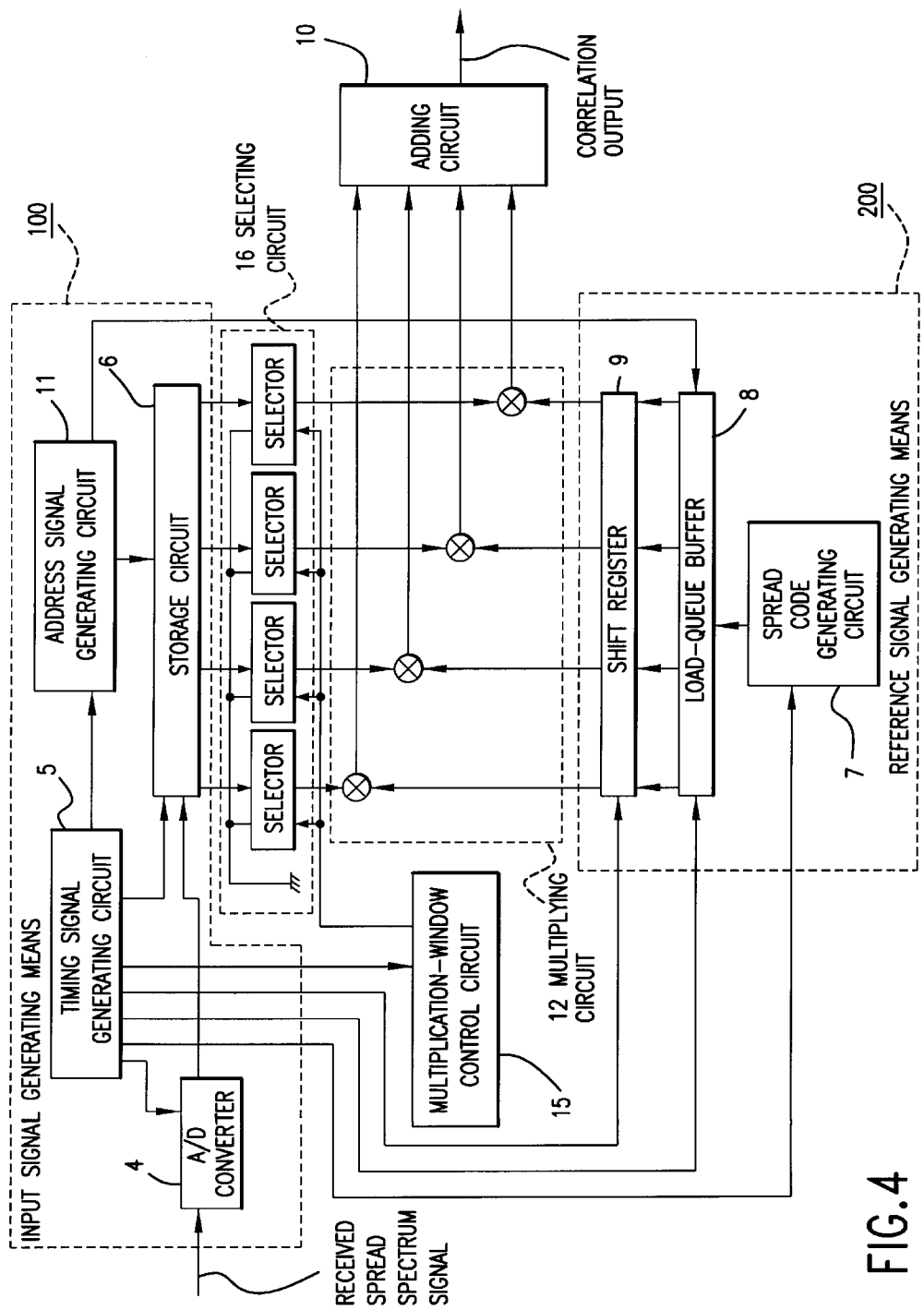
FIG. 4 is a block diagram showing a digital matched filter according to Embodiment 3 of the present invention.

Next description is made for Embodiment 3 of the present invention. In Embodiment 3, description is made for a case where one information bit length is different from a spread code length (generally, spread code length>one information bit length) like in the case of Embodiment 2. FIG. 4 is a block diagram showing a digital matched filter according to Embodiment 3.

In the figure, the reference numerals 4 to 12 indicate the same configuration as that in Embodiment 1 shown in FIG. 1, so that description thereof is omitted herein. The reference numeral 16 indicates a selecting circuit for selecting either one of input data outputted from the storage circuit and null data indicating no-input state, and each selector is provided therein for each output of input data. Herein, an example of selecting a GND level as null data is shown. The reference numeral 15 indicates a multiplication-window control circuit for controlling the selecting circuit 16, and, as for input data in a portion exceeding one information bit length which is an object for correlation processing, the selecting circuit selects data so that input data is generated by using the null data.

Next description is made for main points of operations. As described in Embodiment 2, it is assumed herein that sampling in the A/D converter 4 is executed once for each one spread code time. In a case where a spread code length is longer than one information bit length like in a case of Embodiment 3, a memory space in the storage circuit 6 is required to be made larger than that for one information bit. Namely, assuming that the number of quantized bits for the A/D conversion is m bits, the spread code length is (n+α) bits (wherein, n indicates one information bit length obtained by normalizing one spread code length as one bit (namely, the number of sampling times per one information bit), and α indicates a length of spread code length in a portion exceeding one information bit length (namely, the number of sampling times for a portion exceeding one information bit)), at least {m×(n+α)} bits are required for a memory space.

An input data array as an output from the storage circuit 6 is multiplied by a reference data array as an output from the shift register 9, so that a result of multiplication of α-piece values becomes data over one information bit length, which makes worse the computing precision in summing up the values. For this reason, the multiplication-window control circuit 15 selects the code 0 for a portion over one information bit length as an object to be computed by controlling each selector in the selecting circuit 16. With this selection, a result of multiplication of α-piece values as a surplus is fixed to 0, so that an adding operation becomes possible in the adding circuit 10 without being affected by a result of multiplication of α-pieces values, and correlation output for each spread code time can be obtained.

As described above, in Embodiment 3, as for input data in a portion exceeding one information bit length as an object for correlation processing, input data is generated by using the preset null data indicating no-input state and is inputted to the multiplying circuit, so that there is no effect of the portion exceeding one information bit length over correlation output, which brings thereinto such effects that correlation processing with higher precision can be executed.

Figure 5:
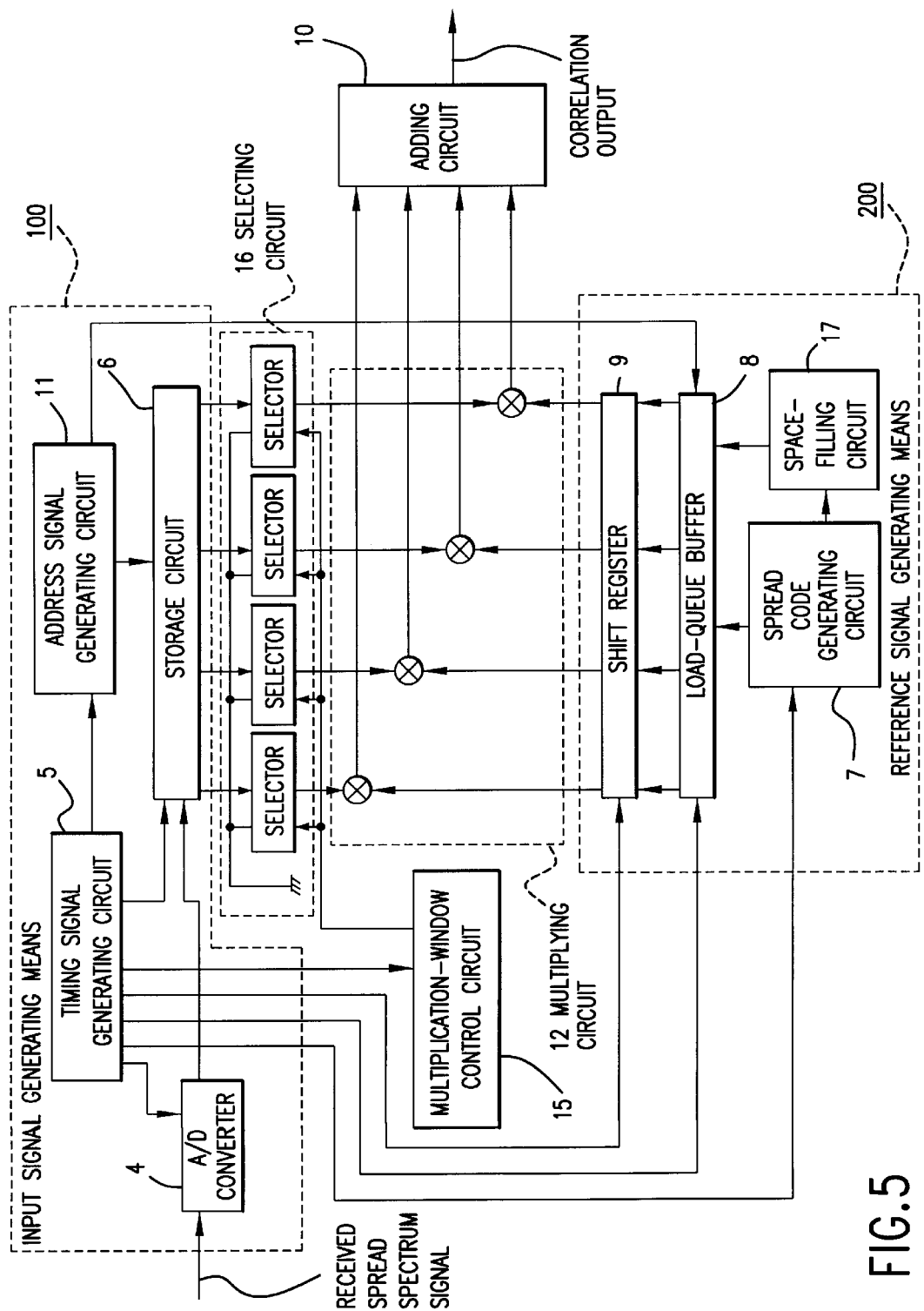
FIG. 5 is a block diagram showing a digital matched filter according to Embodiment 4 of the present invention.

Next description is made for Embodiment 4 of the present invention. In Embodiment 4, description is made for a case where one information bit length is different from a spread code length (generally, spread code length>one information bit length) like in the case of Embodiment 3. FIG. 5 is a block diagram showing a digital matched filter according to Embodiment 4.

In the figure, the reference numerals 4 to 16 indicate the same configuration as that in Embodiment 3 shown in FIG. 4, so that description thereof is omitted herein. The reference numeral 17 indicates a space-filling circuit for filling all spread codes equivalent to surplus α bits in a portion exceeding one information bit length as an object of correlation processing with null data (0 or 1) indicating no-input state.

Next description is made for main points of operations. As described in Embodiment 3, it is assumed herein that sampling in the A/D converter 4 is executed once for each one spread code time. In a case where sampling data in the A/D converter 4 has code bits as MSB and is an output consisting of two complements, or in a case where an output from the A/D converter 4 is converted to a form consisting of two complements in which code bits are the MSB to be accumulated in the storage circuit 6, it is known that the multiplying circuit 12 comprising simple reverse circuits such as an exclusive OR or the like is generally used. In this case, even if the selecting circuit 16 provided at the output terminal of the storage circuit 6 selects 0 for α-pieces of surplus bit, a result of multiplication does not always become zero (0). For this reason, a spread code array from the spread code generating circuit 7 is inputted to the space-filling circuit 17 and such bits as those each giving zero (0) as a result of multiplication are imbedded in the spread code array previously in correspondence with surplus α bits. All the bits to be imbedded therein may be 0 or 1 depending on the configuration. For instance, a case is assumed herein where the multiplying circuit 12 comprises reverse circuits each for outputting an exclusive OR and the adding circuit 10 handles an input with 0 as null data. In this case, when the spread codes in the transmitting side are 00101, the spread code generating circuit 7 generates codes of 00101, the selecting circuit 16 selects 0 for surplus bits, and the space-filling circuit allocates 1 to the bits. With this operation, a result of multiplication of the surplus α-piece values is fixed to 0, so that an adding operation can be executed in the adding circuit 10 without being affected by the result of multiplication, and correlation output for each spread code can be obtained.

As described above, in Embodiment 4, as for the reference data in a portion exceeding one information bit length which is an object for correlation processing, reference data is generated by using the preset null data indicating no-input state and is inputted to the multiplying circuit, so that there is no effect by the portion exceeding one information bit length over correlation output, which insures such effects as that correlation processing with higher precision can be executed.

Figure 6:
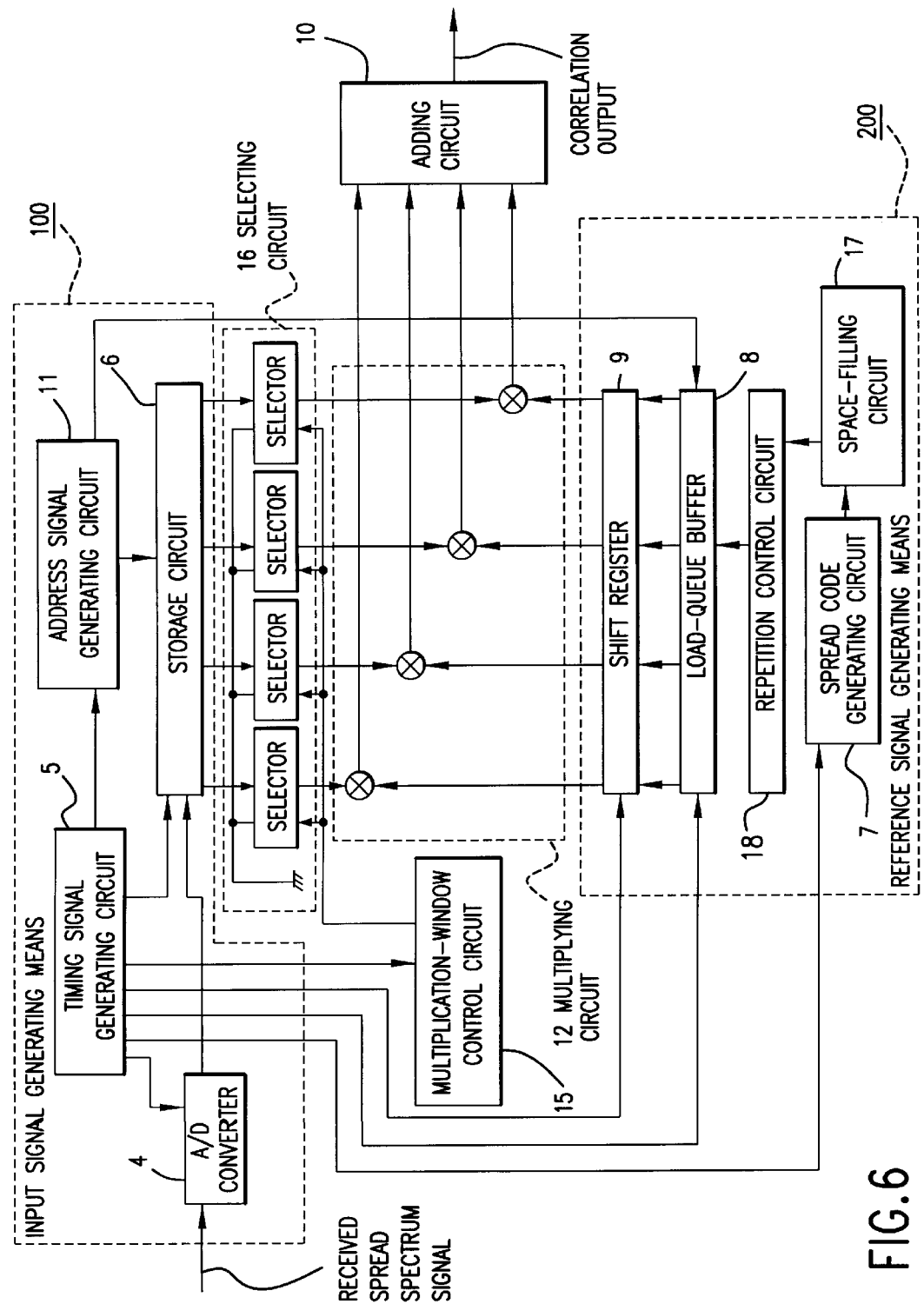
FIG. 6 is a block diagram showing a digital matched filter according to Embodiment 5 of the present invention.

Next description is made for Embodiment 5 of the present invention. In Embodiment 5, description is made for a case where sampling is executed a plurality of times within one spread code time. FIG. 6 is a block diagram showing a digital matched filter according to Embodiment 5.

In the figure, the reference numerals 4 to 17 indicate the same configuration as that in Embodiment 4 shown in FIG. 5, so that description thereof is omitted herein. The reference numeral 18 indicates a repetition control circuit for repeatedly outputting bits used for spread codes as well as for filling the space only times equivalent to sampling times in one spread code length.

Next description is made for main points of operations. There is generally known such configuration that sampling in the A/D converter 4 is executed once for every ½, ¼, ⅛, 1/16 or the like of one spread code time taking into a case where each timing for receiving is displaced from each other by a period of time shorter than one spread code time. Description is made herein for a case where sampling is executed once for every ½ of one spread code time; namely in a case of sampling at a frequency twice higher than that in the normal mode. Further in this case, code of 00101 is generated in the spread code generating circuit, the space-filling circuit outputs 1 for all codes so that all of 5 bits as surplus bits are treated as null data in the adding circuit 10. Code of "00101" is outputted from the spread code generating circuit, and code of "11111" is outputted from the space-filling circuit 17. When the codes described above are inputted to the repetition control circuit 18, code of "0000110011111111111" is outputted. By inputting the code into the shift register 9 and using the code as a reference data array, correlation output for each ½ spread code can be obtained.

As described above, in Embodiment 5, by repeatedly generating original spread code or null data, the digital matched filter with simple configuration can manage correlation processing in over-sampling.

Figure 7:
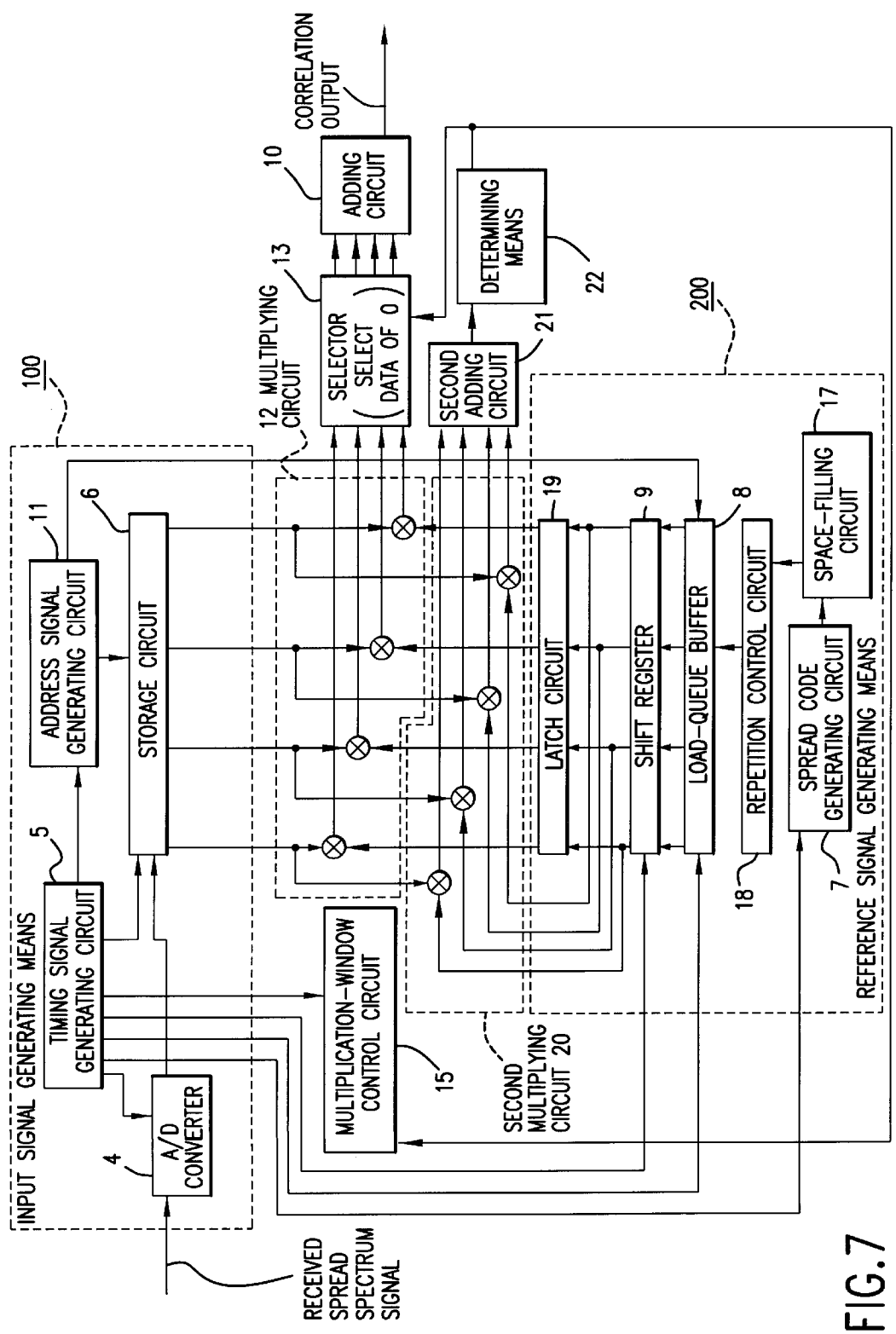
FIG. 7 is a block diagram showing a digital matched filter according to Embodiment 6 of the present invention.

Next description is made for Embodiment 6 of the present invention. FIG. 7 is a block diagram showing a digital matched filter according to Embodiment 6.

In the figure, the reference numerals 4 to 18 indicate the same configuration as that according to Embodiment 5 shown in FIG. 6, so that description thereof is omitted herein. The reference numeral 19 indicates a latch circuit 19 for latching an output from the shift register 9. It is assumed in the description hereinafter that an output from the shift register 9 which is an input to the latch circuit is described as a second reference data array (which becomes earlier reference data in time sequence) and an output from the latch circuit is described simply as a reference data array (which become later reference data in time sequence). In the figure, designated at the reference numeral 20 is a second multiplying circuit for multiplying data in the second reference data array by data in an input data array as an output from the storage circuit, at 21 a second adding circuit for summing each output from the second multiplying circuit, and at 22 a determining circuit for determining data according to the output from the second adding circuit. The reference numeral 13 indicates a selecting circuit for controlling an output from a first multiplying circuit 12, which selects either one of multiplied data and null data according to each operation in the addition-window control circuit 14 as well as in the determining circuit 22. The first multiplying circuit 12 described herein indicates a multiplying circuit for multiplying a reference data array which becomes later in time sequence caused by latching an output from the shift register 9 by an output from the storage circuit 6.

Next description is made for main points of operations. An output from the shift register 9 is made delayed by a period of time required for operations in the second adding circuit 21 as well as in the determining circuit 22 and latched by the latch circuit 19. When a period of time longer as compared to a sampling rate in the A/D converter 4 is required for the adding and determining operations described above, a multi-stage latch circuit is required. Description is made hereinafter for a case where the adding and determining operations are finished within a time required for one sampling; namely, for a case where the latch circuit 19 comprises a one-stage latch.

A signal inputted in the latch circuit 19 (an earlier reference data array in time sequence) is inputted in the second multiplying circuit 20 and is multiplied by output from the storage circuit 6. This result of the multiplication is added by the second adding circuit 21 and a result of the addition is inputted in the determining circuit 22. In the determining circuit 22, detection is made as to whether a value of the result is smaller than a reference correlation value as a preset default value or not. In a case where it is detected that the value is smaller, a result of the detection is returned to the addition-window control circuit 14 and a supply of a clock to the latch circuit is stopped (the latch data is not updated). A clock is continuously supplied to the shift register 9, and new information is supplied to the second adding circuit in the next cycle (after a period of time required for one sampling). An output from the determining circuit 22 is also inputted to the selecting circuit 13 for the first multiplying circuit 12. When information indicating the fact that some established value is smaller is inputted in the selecting circuit 13, the selector 13 selects 0 as null data, but the addition-window control circuit 14 does not change control to the selector 13 (does not displace a position of the window). With this operation, in a state in which only correlation output smaller than some established value is continuously obtained, the first multiplying circuit 12, latch circuit 19, selecting circuit 13, and adding circuit 10 in which bits accumulated anew in the storage circuit 6 are excluded do not change a potential level to 0 or 1, and on the other hand, correlation output more than some established value can accurately be obtained.

As described above, in Embodiment 6, when the correlation output is not more than some established value, the multiplying circuit, latch circuit, selecting circuit, adding circuit or the like are controlled not to operate, so that less power consumption can be realized.

Figure 8:
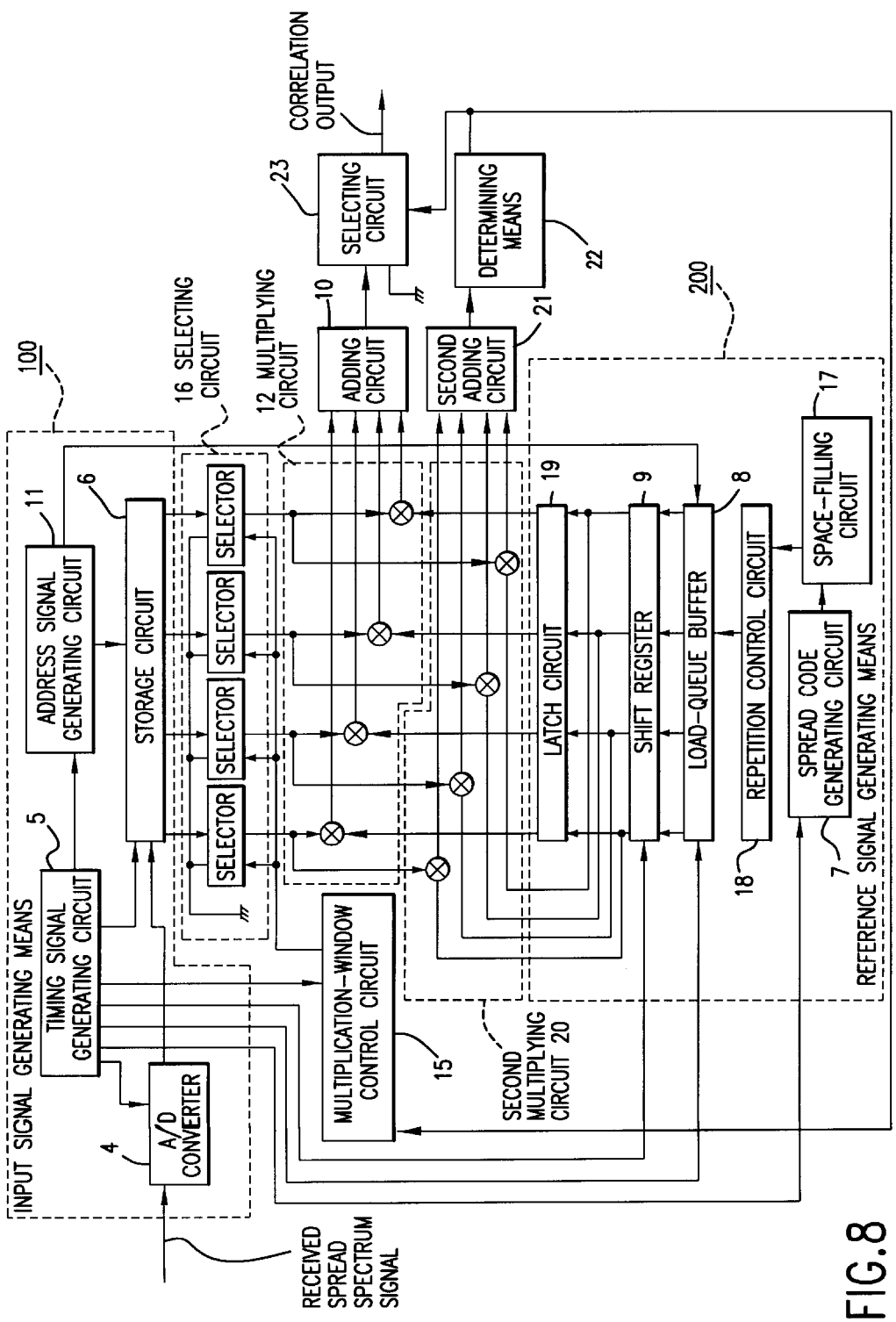
FIG. 8 is a block diagram showing a digital matched filter according to Embodiment 7 of the present invention.

Next description is made for Embodiment 7 of the present invention. FIG. 8 is a block diagram showing a digital matched filter according to Embodiment 7.

In the figure, the reference numerals 4 to 18 indicate the same configuration as that in Embodiment 5 shown in FIG. 6, so that description thereof is omitted herein. The reference numeral 19 indicates the latch circuit 19 for latching an output from the shift register 9. It is assumed in the description hereinafter that an output from the shift register 9 which is an input to the latch circuit is described as the second reference data array (which becomes earlier reference data in time sequence) and an output from the latch circuit is described simply as reference data array (which become later reference data in time sequence). In the figure, designated at the reference numeral 20 is the second multiplying circuit for multiplying data in the second reference data array by data in an input data array as an output from the storage circuit, at 21 the second adding circuit for summing each output from the second multiplying circuit, and at 22 a determining circuit for determining data according to the output from the second adding circuit. The reference numeral 23 indicates a selecting circuit for controlling an output from the first adding circuit 10, which selects either one of added data and null data according to the operation in the determining circuit 22. The first multiplying circuit 12 described herein indicates a multiplying circuit for multiplying a reference data array, which is timely delayed because of latching an output from the shift register 9, by an output from the storage circuit 6.

Next description is made for main points of operations. An output from the shift register 9 is delayed only by a period of time required for operations in the second adding circuit 21 as well as in the determining circuit 22 and latched by the latch circuit 19. When a longer period of time is required for the adding and determining operations described above as compared to a sampling rate in the A/D converter 4, a multi-stage latch circuit is required. Description is made hereinafter for a case where the adding and determining operations are finished within a time required for one sampling, namely, for a case where the latch circuit 19 comprises an one-stage latch.

A signal inputted in the latch circuit 19 (an earlier reference data array in time sequence) is inputted in the second multiplying circuit 20 and is multiplied by output from the storage circuit 6. This result of the multiplication is added by the second adding circuit 21 and a result of the addition is inputted in the determining circuit 22. In the determining circuit 22, detection is made as to whether a value of the result is smaller than a reference correlation value which is a preset established value or not. In a case where it is detected that the value is smaller, a result of the detection is returned to the multiplication-window control circuit 15 and a supply of a clock to the latch circuit is stopped (the latch data is not updated). A clock is continuously supplied to the shift register 9, and new information is supplied to the second adding circuit in the next cycle (after a period of time required for one sampling). An output from the determining circuit 22 controls whether 0 as null data is selected or not by using the selecting circuit 23 for the first adding circuit 10 because control over windows in the selecting circuit 16 for the storage circuit 6 is not affected by the output from the determining circuit 22. With this operation, in a state in which only correlation output smaller than some established value is continuously obtained, the first multiplying circuit 12 in which bits accumulated anew in the storage circuit 6 are excluded and the latch circuit 19 do not change a potential level to 0 or 1, and on the other hand, correlation output more than some established value can accurately be obtained.

As described above, in Embodiment 7, when the correlation output is not more than some established value, the multiplying circuit and latch circuit or the like are controlled not to operate, so that less power consumption can be realized.

Figure 9:
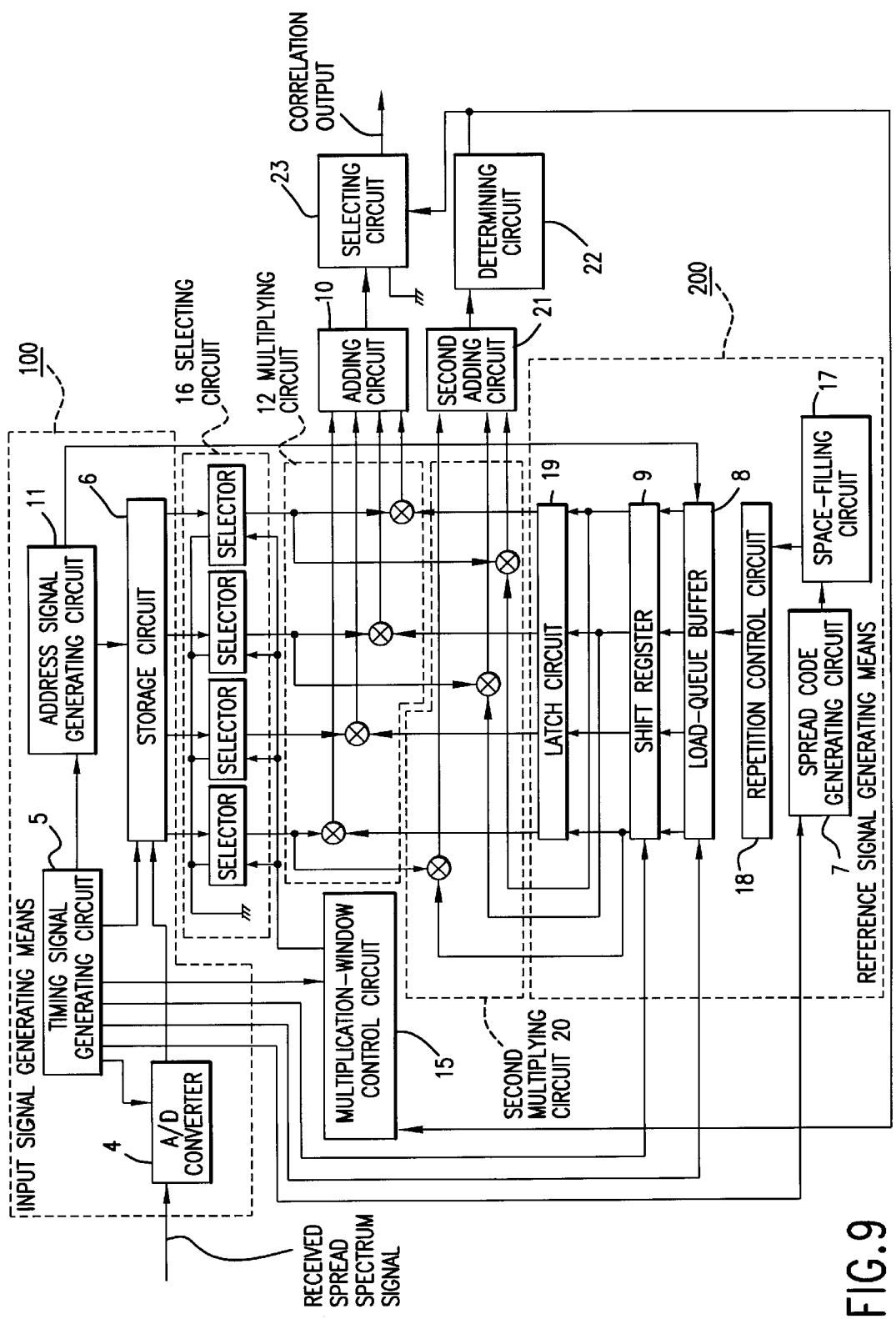
FIG. 9 is a block diagram showing a digital matched filter according to Embodiment 8 of the present invention.
Figure 10:
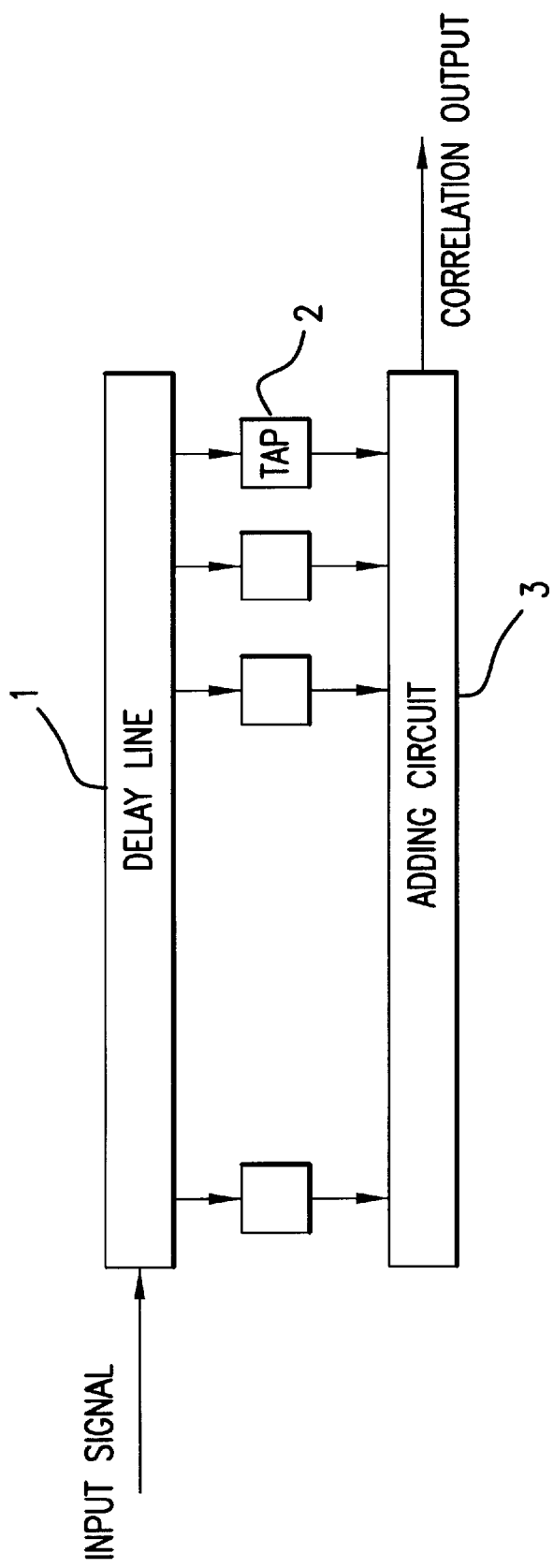
FIG. 10 is a block diagram showing a matched filter based on the conventional technology.
Figure 11:
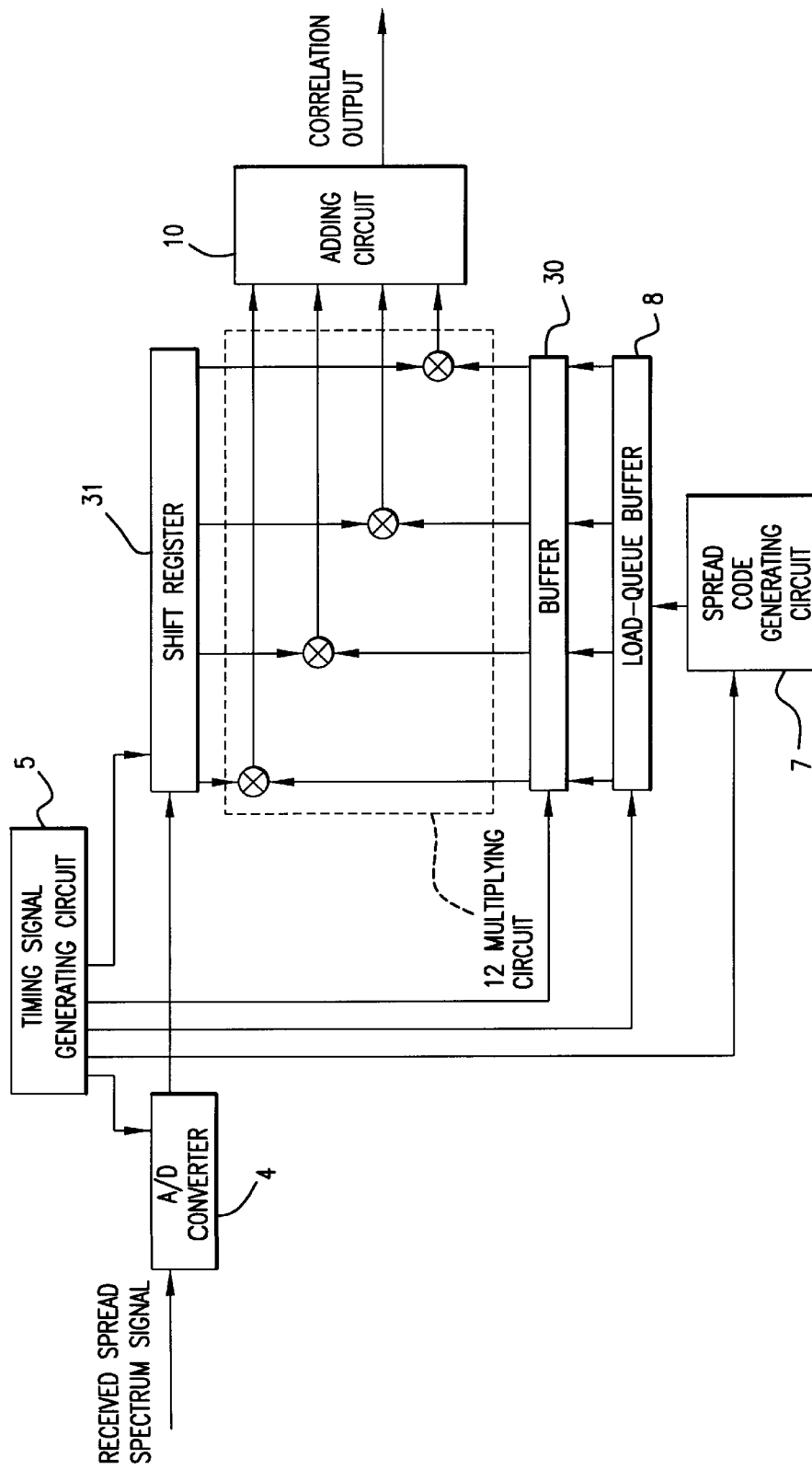
FIG. 11 is a block diagram showing a digital matched filter based on the conventional technology.
Figure 12:
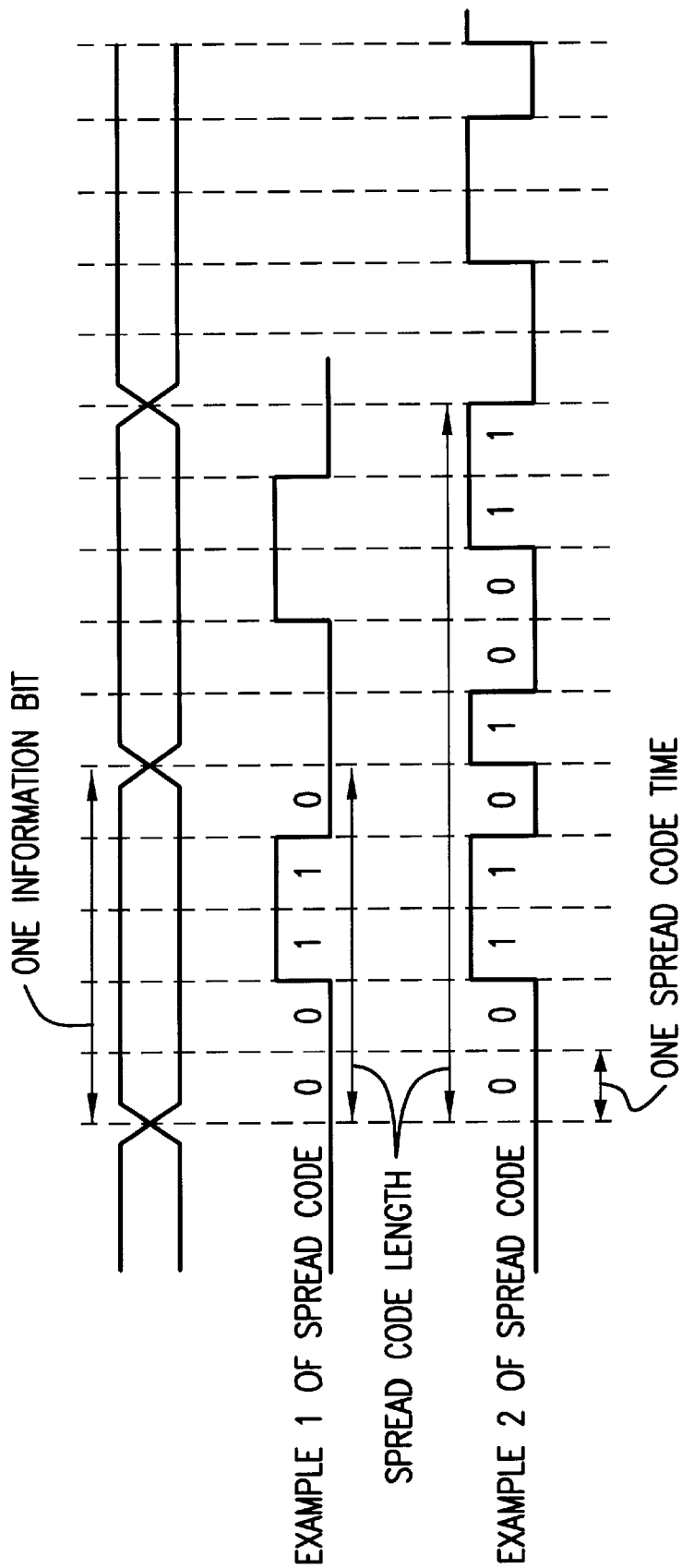
FIG. 12 is an explanatory view explaining correlation between an information signal and a spread code.

Next description is made for Embodiment 8 of the present invention. FIG. 9 is a block diagram showing a digital matched filter according to Embodiment 8.

In the figure, the reference numerals 4 to 23 indicate the same configuration as that according to Embodiment 7 shown in FIG. 8, so that description thereof is omitted herein. It should be noted that, in Embodiment 8, the second multiplying circuit 20 has configuration in which it multiplies only a portion of output from the shift register 9 by that of output from the storage circuit 6, which is a different point from the configuration in Embodiment 7.

Next description is made for main points of operations. A signal inputted in the latch circuit 19 (an earlier reference data array in time sequence) is inputted in the second multiplying circuit 20 and is multiplied by output from the storage circuit 6. This result of the multiplication is added by the second adding circuit 21, but, if a portion of the result of the multiplication is summed up, significant correlation output can be obtained. Description is made for a case, as an example, where the determining circuit 22 makes determination as to whether the value is not less than a correlation value of 16 which is ¼ of the maximum correlation value or not on the condition that, for instance, one information bit is spread to a broadband with spread code by 64 in a transmitting side, a correlation output value when correlation is obtained for all bits with the digital matched filter in the receiving side is set to 64, and that when correlation is not obtained for all bits therewith is set to −64. Under the condition described above, assuming that the number of bits each giving positive correlation is a chips, the number of bits giving negative correlation is 64−a, so that the following expression is obtained:

$$+a-(64-a) \geq 16$$

so that, the following number is obtained : $a \geq 40$. In other words, in a case where there are 24 chips of negative correlation value in the filter or in a case where there are 40 chips of positive value therein, any more addition is not required. Accordingly, if the filter has such configuration in which partial correlation for 48 chips is executed therein, and assuming that correlation output which is not significant is random, it is possible to detect correlation output which is not significant in the probability of more than ½. If the number thereof is increased more than 48, the probability of the detection largely increases. As described above, even all the results of the multiplication in the second multiplying circuit 20 is not summed up, it is possible to obtain a result of determination which is sufficiently significant.

As described above, in Embodiment 8, the second multiplying circuit and second adding circuit are simplified as compared to those in Embodiment 7, so that less power consumption can further be realized.

As described above, the digital matched filter according to the present invention has the configuration in which input data comprising of a plurality of sampled quantized bits is stored at a particular storage site specified according to a result of sampling not to be shifted and a spread code array having one bit configuration as a reference data array is shifted, so that the number of circuit elements in which data is shifted each time sampling is executed in the circuit block can be reduced and moreover changes of potentials of 0 and 1 in the circuit can be reduced, and for this reason less power consumption can be realized.

Also in the digital matched filter according to the present invention, as for multiplied data in a portion exceeding one information bit length which is an object for correlation processing, multiplied data is generated by using preset null data indicating no-input state and inputted in an adding circuit, so that it is possible to eliminate influence of the multiplied data in a portion exceeding one information bit length, and as a result, there is provided the advantage that it is possible to execute correlation processing with higher precision.

As for input data in a portion exceeding one information bit length which is an object for correlation processing, input data is generated by using preset null data indicating no-input state and inputted in a multiplying circuit, so that it is possible to eliminate influence of the input data in a portion exceeding one information bit length, and as a result, there is provided the advantage that it is possible to execute correlation processing with higher precision.

As for reference data in a portion exceeding one information bit length which is an object for correlation processing, reference data is generated by using preset null data indicating no-input state and inputted in a multiplying circuit, so that it is possible to eliminate influence of the reference data in a portion exceeding one information bit length, and as a result, there is provided the advantage that it is possible to execute correlation processing with higher precision.

Also there is provided the advantage that it is possible to enable correlation processing with simpler configuration by repeatedly generating either the original spread code or null data in over-sampling.

Also, the multiplying circuit, latch circuit, selecting circuit, or other related components do not operate when correlation output is not more than a specified value, so that there is provided the advantage that it is possible to realize less power consumption.

Also the multiplying circuit, latch circuit, or other related components do not operate when correlation output is not more than another specified regulation value, so that there is provided the advantage that it is possible to realize less power consumption.

The number of data in a data array which is an object for multiplication is reduced to use only a portion thereof, and the second multiplying circuit and second adding circuit are simplified, so that there is provided the advantage that it is possible to realize further power saving.

The number of bits in data which is an object for multiplication is reduced to use only a portion thereof, and the second multiplying circuit and second adding circuit are simplified, so that there is provided the advantage that it is possible to realize further power saving.

This application is based on Japanese patent application No. HEI 8-329561 filed in the Japanese Patent Office on Dec. 10, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital matched filter for executing correlation processing of an input received spread spectrum signal with a spread code, comprising:

an input signal generating means for generating an input data array, said input signal generating means including means for sampling a received spread spectrum signal according to a timing signal, said spread spectrum signal having been generated by applying a spread code array of specified spread code length n (wherein n is an integer greater than 1) to an information signal having a plurality of information bits, and quantizing each sample of said received spread spectrum signal using a quantization interval of m bits (wherein m is an integer greater than 1), and a storage circuit having n storage locations, each storage location storing an m-bit quantized sample of said received spread spectrum signal, wherein said storage circuit outputs n m-bit samples of said received spread spectrum signal according to said timing signal as said input data array;

a reference signal generating means for outputting a reference data array of length n corresponding to said spread code array, said reference signal generating means including a shift register for incrementally shifting said reference data array according to said timing signal;

a multiplying circuit for multiplying said input data array by said reference data array and outputting multiplied data results; and an adding circuit for adding together said multiplied data results and outputting the result as a correlation value.

2. A digital matched filter according to claim 1; wherein said reference signal generating means generates and outputs a reference data array consisting of spread code repeated by a sampling time within one spread code length.

3. A digital matched filter according to claim 1 comprising:

a latch circuit for storing a second reference data array which is an output from a shift register and outputting the second reference data array as a new reference data array;

a second multiplying circuit for multiplying data in an input data array by corresponding data in said second reference data array and outputting a plurality of generated second multiplied data;

a second adding circuit for summing the plurality of second multiplied data and outputting a second correlation value generated as described above; and a determining means for comparing the second correlation value, or a value obtained by summing up the second correlation value to input data, transmitted data for which is transparent in the system, once for every one spread code length or at a cycle shorter than one spread code length required in the system to a present reference correlation value and outputting a result of determination; said digital matched filter selecting either the multiplied data outputted from the multiplying circuit or preset null data indicating no-input state according to the result of determination and inputting the selected data in the adding circuit.

4. A digital matched filter according to claim 3; wherein said second multiplying circuit executes multiplication of only a portion of input data in an input data array outputted from the storage circuit by the corresponding second reference data and outputs second multiplied data.

5. A digital matched filter according to claim 3; wherein said second multiplying circuit executes multiplication of only a portion of quantized bits among a plurality of quantized bits in the input data outputted from the storage circuit by the corresponding second reference data and outputs second multiplied data.

6. A digital matched filter according to claim 1 comprising:

a latch circuit for storing a second reference data array which is an output from a shift register and outputting the second reference data array as a new reference data array;

a second multiplying circuit for multiplying data in an input data array by corresponding data in said second reference data array and outputting a plurality of generated second multiplied data;

a second adding circuit for summing the plurality of second multiplied data and outputting a second correlation value generated as described above; and a determining means for comparing the second correlation value, or a value obtained by summing up the second correlation value to input data, transmitted data for which is transparent in the system, once for every one spread code length or at a cycle shorter than one spread code length required in the system to a present reference correlation value and outputting a result of determination; said digital matched filter selecting either the input data outputted from the storage circuit or preset null data indicating no-input state according to the result of determination and inputting the selected data in the multiplying circuit.

7. A digital matched filter according to claim 6; wherein said second multiplying circuit executes multiplication of only a portion of input data in an input data array outputted from the storage circuit by the corresponding second reference data and outputs second multiplied data.

8. A digital matched filter according to claim 6; wherein said second multiplying circuit executes multiplication of only a portion of quantized bits among a plurality of quantized bits in the input data outputted from the storage circuit by the corresponding second reference data and outputs second multiplied data.

9. A digital matched filter according to claim 1; wherein, as for multiplied data in a portion exceeding one information bit length which is an object for correlation processing, a preset null data indicating no-input state is inputted in place of said multiplied data in the adding circuit.

10. A digital matched filter according to claim 9; wherein said reference signal generating means generates and outputs a reference data array consisting of spread code repeated by a sampling time within one spread code length.

11. A digital matched filter according to claim 1; wherein, as for input data in a portion exceeding one information bit length which is an object for correlation processing, a preset null data indicating no-input state is inputted in place of said input data in the multiplying circuit.

12. A digital matched filter according to claim 11; wherein said reference signal generating means generates and outputs a reference data array consisting of spread code repeated by a sampling time within one spread code length.

13. A digital matched filter according to claim 1; wherein said reference signal generating means generates and outputs a reference data array for reference data in a portion exceeding one information bit length which is an object for correlation processing by using said preset null data indicating no-input state in place of the spread code.

14. A digital matched filter according to claim 13; wherein said reference signal generating means generates and outputs a reference data array consisting of spread code repeated by a sampling time within one spread code length.

* * * * *